(12) United States Patent
Morales

(10) Patent No.: US 11,940,865 B2
(45) Date of Patent: *Mar. 26, 2024

(54) ON-CHIP SYSTEM WITH CONTEXT-BASED ENERGY REDUCTION

(71) Applicant: Ambiq Micro, Inc., Austin, TX (US)

(72) Inventor: Carlos Morales, San Diego, CA (US)

(73) Assignee: Ambiq Micro, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,793

(22) Filed: Jan. 13, 2023

(65) Prior Publication Data
US 2024/0028105 A1     Jan. 25, 2024

Related U.S. Application Data

(63) Continuation of application No. 17/814,832, filed on Jul. 25, 2022, now Pat. No. 11,556,167.

(51) Int. Cl.
*G06F 1/32* (2019.01)
*G06F 1/3296* (2019.01)

(52) U.S. Cl.
CPC ................. *G06F 1/3296* (2013.01)

(58) Field of Classification Search
CPC .............. G06F 1/32; G06F 9/44; G06F 1/12
See application file for complete search history.

(56) References Cited

U.S. PATENT DOCUMENTS

| | | | |
|---|---|---|---|
| 11,388,226 B1* | 7/2022 | Anderton | G06Q 10/10 |
| 2010/0115314 A1* | 5/2010 | Sultenfuss | G06F 1/3203 713/323 |
| 2014/0223157 A1* | 8/2014 | Li | G06F 1/3215 713/300 |
| 2016/0154455 A1* | 6/2016 | Kawabe | G06F 1/324 713/320 |
| 2020/0333868 A1 | 10/2020 | Gruber | |

* cited by examiner

*Primary Examiner* — Keshab R Pandey
(74) *Attorney, Agent, or Firm* — Nixon Peabody LLP

(57) ABSTRACT

A system for computing devices includes a central processing unit (CPU that is configured to perform in a plurality of power modes, each power mode being pre-defined to have a different code-execution performance capability than remaining ones of the plurality of power modes. The system further includes a sampling peripheral, an electrical output, and a memory device. The memory device is configured to select and execute a specific module from the plurality of modules based on the context-identifying input triggering the specific module. If triggered, each module is executed to receive the context-identifying input from the sampling peripheral, and to operate the CPU in a dedicated power mode of the plurality of power modes.

20 Claims, 10 Drawing Sheets

ON-CHIP SYSTEM WITH CONTEXT-BASED ENERGY REDUCTION

CROSS-REFERENCE TO RELATED APPLICATIONS

This application is a continuation of U.S. application Ser. No. 17/814,832, filed Jul. 25, 2022, now allowed, which is hereby incorporated by reference herein in its entirety.

FIELD OF THE INVENTION

The present invention relates generally to computing devices, and more specifically, to system-on-a-chip (SoC) microcontrollers for switching between power modes of a central processing unit (CPU).

BACKGROUND OF THE INVENTION

In recent years, due to the growth of portable electronics, there has been a push to decrease the power used by microcontrollers (or "MCU"), microprocessors, application processors, digital signal processors (DSPs), neural processing units (NPUs), and other circuits used in portable electronic appliances. Power consumption is highly correlated to types of sensors and actuators being used, the respective modes, sampling rates, and algorithms used to act on collected data. With lower power requirements, effective electronics operation time can be extended, or alternatively, smaller batteries can be used. Commonly, the power consumption of a microcontroller and associated circuits may be reduced by using a lower supply voltage, or by reducing the amount of internal capacitance being charged and discharged during the operation of the circuit.

One method for reducing microcontroller power relies on hardware or software-based power mode switching. Power modes can be selected for microcontroller components or resources based on operating state, operating conditions, and/or sleep cycle characteristics and other factors to configure low power modes for selected microcontroller components at the time the processor enters a low power or sleep state. In some systems, a set of predefined low power configurations can be used, while more sophisticated systems can dynamically select low power configurations to maximize power savings while still meeting system latency requirements.

Current computing devices, however, operate inefficiently in the power modes, lacking adequate switching between the power modes. Thus, even with available low power modes, microcontroller power usage can be adversely affected by interactions with connected sensors, memory systems, or other peripherals. Frequent interrupts or requests for service from such peripherals can greatly limit the time a microcontroller can remain in a low power mode. In another example, computing chips are turned on at the same rate, regardless of activity level, which results in using unnecessary power. Systems that provide a reliable overall power management protocol and components for very low power operation are still needed.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a system for computing devices includes a central processing unit (CPU) that is configured to perform in a plurality of power modes. Each power mode is pre-defined to have a different code-execution performance capability than remaining ones of the plurality of power modes. The system further includes at least one sampling peripheral that is communicatively coupled to the CPU for receiving context-identifying input from one or more sensors. The at least one sampling peripheral is dedicated to a specific power mode of the plurality of power modes, and it has an associated behavior that is specific to the at least one sampling peripheral. The system further includes at least one electrical output that is communicatively coupled to the CPU. The at least one electrical output is dedicated to a specific power mode of the plurality of power modes, and it has an associated behavior that is specific to the at least one electrical output. The system further includes a memory device that is communicatively coupled to the at least one sampling peripheral and the at least one electrical output. The memory device has stored thereon a plurality of modules, and is configured to select and execute a specific module from the plurality of modules based on the context-identifying input triggering the specific module. If triggered, each module is executed to receive the context-identifying input from the at least one sampling peripheral, and to operate the CPU in a dedicated power mode of the plurality of power modes.

According to other aspects of the present disclosure, a method is directed to selecting a power mode for a computing device. The method includes operating a central processing unit (CPU) in a plurality of power modes, each power mode being pre-defined to have a different code-execution performance capability than remaining ones of the plurality of power modes. The method further includes receiving, via an electrical output, context-identifying input from one or more sensors. The sampling peripheral is dedicated to a specific power mode of the plurality of power modes, and the sampling peripheral has an associated behavior that is specific to the sampling peripheral. The method further includes outputting, via an electrical output, a performance command. The electrical output is dedicated to a specific power mode of the plurality of power modes, and the electrical output has an associated behavior that is specific to the sampling peripheral. The method further includes selecting and executing, via a memory device, a specific module from a plurality of modules based on the context-identifying input triggering the specific module. The method further includes receiving, by the specific module, the context-identifying input from the sampling peripheral. The method further includes operating, by the specific module, the CPU in a dedicated power mode of the plurality of power modes.

According to other aspects of the present disclosure, a non-transitory computer readable medium has stored thereon software instructions that, when executed by a processor, cause the processor to execute user provided software on a chip having a microcontroller system. The software instructions further cause to operate the processor in a plurality of power modes, each power mode being pre-defined to have a different code-execution performance capability than remaining ones of the plurality of power modes. The software instructions further cause to receive, via a sampling peripheral, context-identifying input from one or more sensors. Each sampling peripheral is dedicated to a specific power mode of the plurality of power modes, and the sampling peripheral has an associated behavior that is specific to the sampling peripheral. The software instructions further cause to output, via an electrical output, a performance command. The electrical output is dedicated to a specific power mode of the plurality of power modes, and the electrical output has an associated behavior that is specific to the sampling peripheral. The software instructions further cause to select and execute a specific module from a plurality of modules based on the context-identifying input triggering the specific module. The software instructions further cause to receive, by the specific module, the context-identifying input from the sampling peripheral. The software instructions further cause to operate, by the specific module, the processor in a dedicated power mode of the plurality of power modes.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Figure 1:
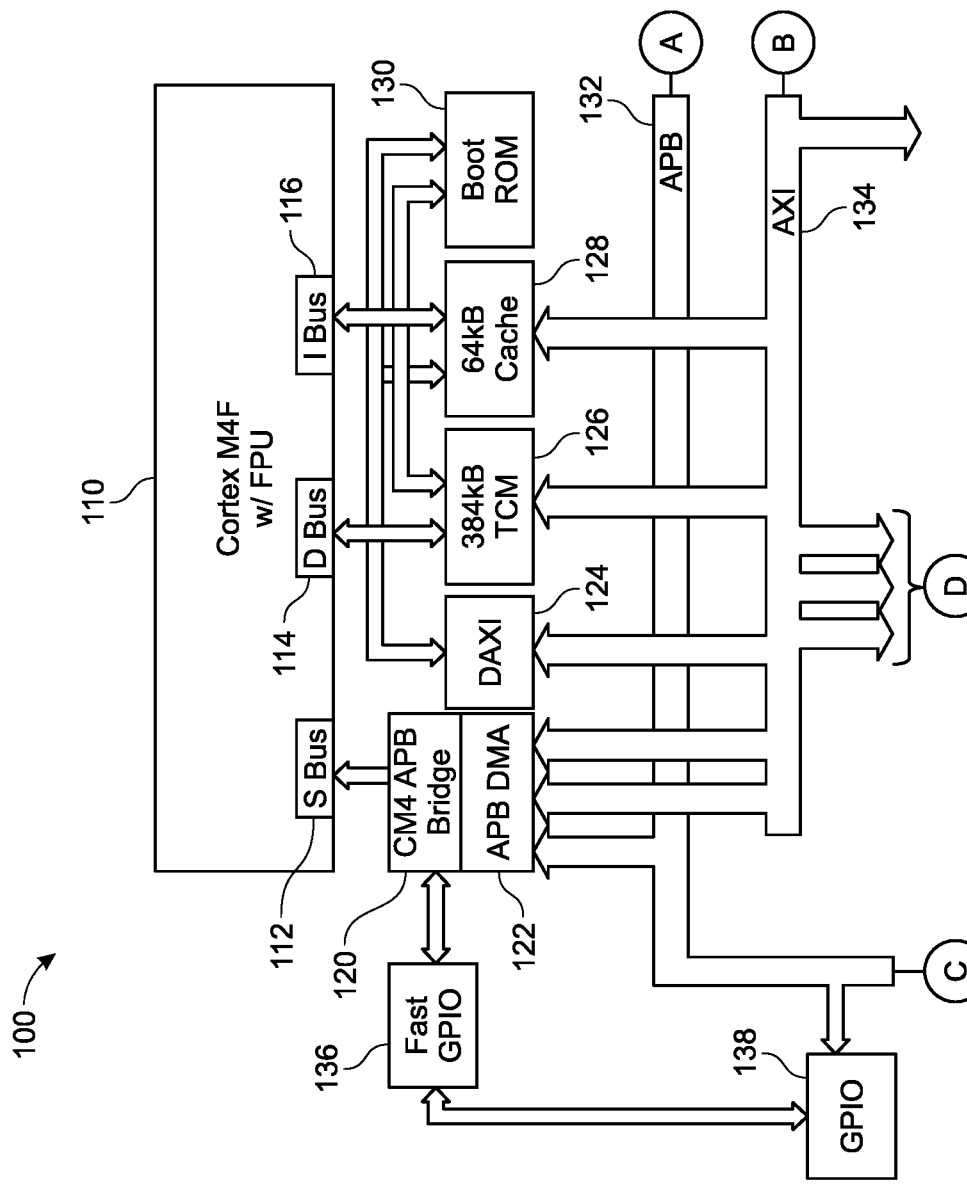
FIG. 1 is a block diagram illustrating an example of a low-power microcontroller system, according to aspects of the present disclosure.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 2:
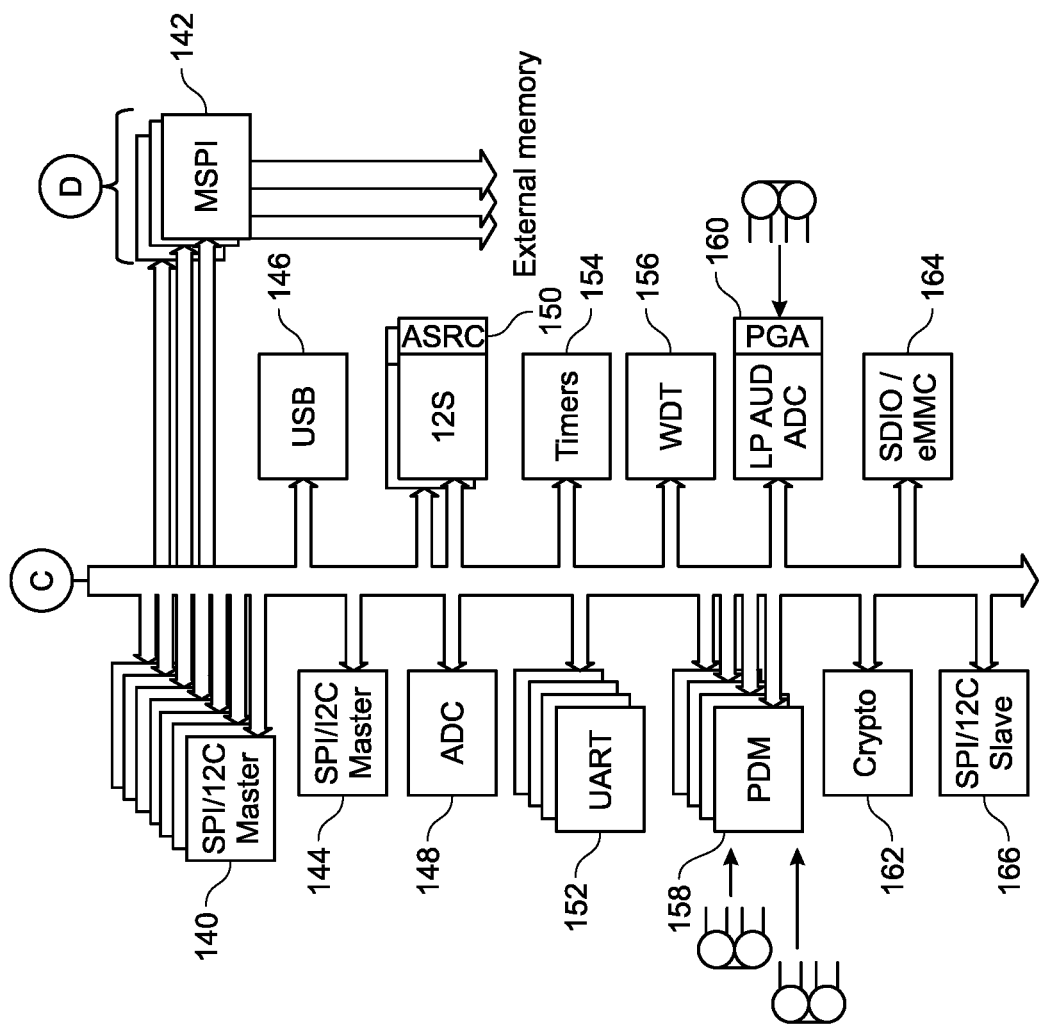
FIG. 2 is a continuation of the block diagram of FIG. 1.
Figure 3:
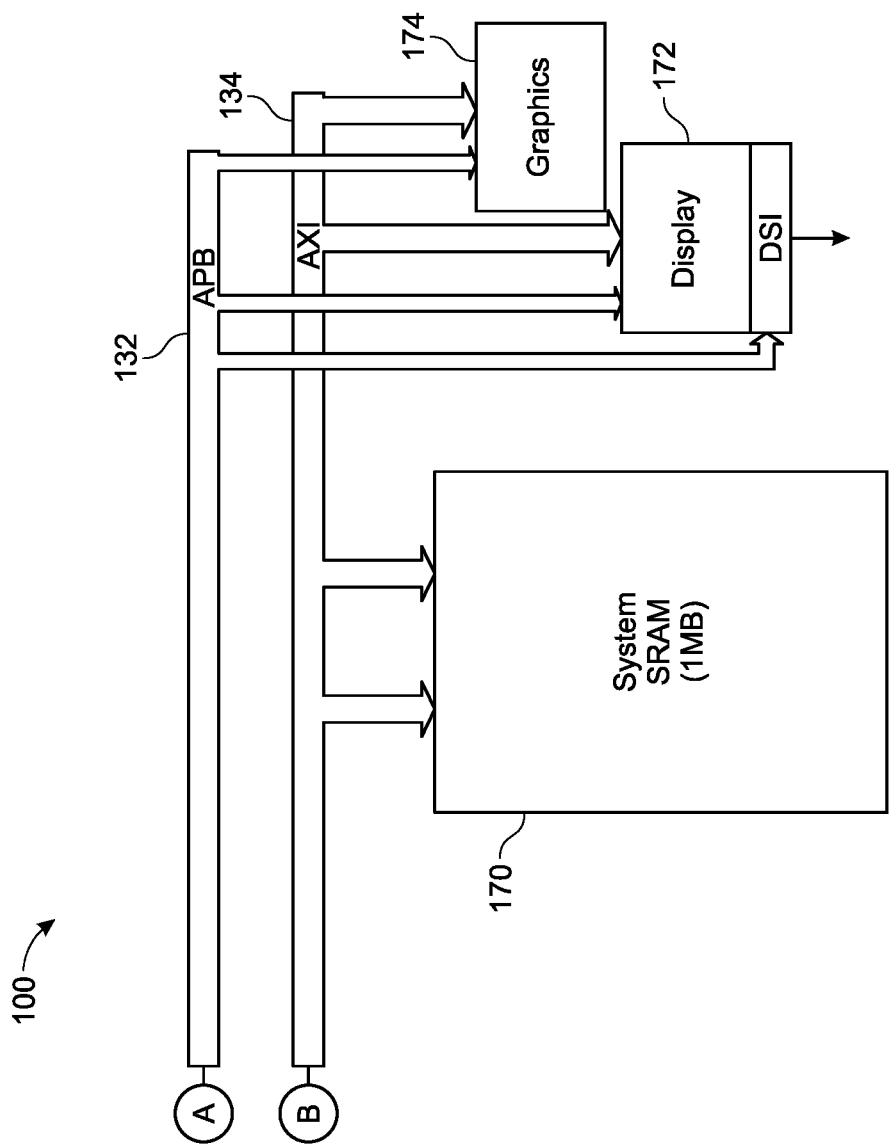
FIG. 3 is a continuation of the block diagram of FIG. 2.

FIGS. 1-3 show a block diagram of an exemplary low-power microcontroller system 100. The exemplary low-power microcontroller system 100 includes a central processing unit (CPU) 110. The CPU 110 in this example is Cortex M4F (CM4) with a floating-point unit. The CPU 110 includes a System-bus interface 112, a Data-bus interface 114, and an Instruction-bus interface 116. It is to be understood, that other types of general CPUs, or other processors such as DSPs or NPUs may incorporate the principles described herein.

The System-bus interface 112 is coupled to a Cortex CM4 advanced peripheral bus (APB) bridge 120 that is coupled to an advanced peripheral bus (APB) direct memory access (DMA) module 122. The microcontroller system 100 includes a Data Advanced eXtensible Interface (DAXI) 124, a tightly coupled memory (TCM) 126, a cache 128, and a boot ROM 130. The Data-bus interface 114 allows access to the DAXI 124, the TCM 126, the cache 128, and the boot read only memory (ROM) 130. The Instruction-bus interface 116 allows access to the TCM 126, the cache 128, and the boot ROM 130. In this example, the DAXI interface 124 provides write buffering and caching functionality for the microcontroller system 100. The DAXI interface 124 improves performance when accessing peripherals like the SRAM and the MSPIs.

An APB 132 and an Advanced eXtensible Interface (AXI) bus 134 are provided for communication between components on the microcontroller system 100. The APB (Advanced Peripheral Bus) is a low speed and low overhead interface that is used for communicating with peripherals and registers that don't require high performance and don't change often (e.g., when a controller wants to set configuration bits for a serial interface). The AXI bus 134 is an Advanced Reduced Instruction Set Computer (RISC) Machines standard bus protocol (referred to as the ARM bus protocol) that allows high speed communications between multiple masters and multiple busses. This is useful for peripherals that exchange large amounts of data (e.g., a controller that talks to an analog to digital converter (ADC) and needs to transfer ADC readings to a microcontroller or a GPU that talks to a memory and needs to transfer a large amount of graphics data to/from memories).

A fast general-purpose input/output (GPIO) module 136 is coupled to the APB bridge 120. A GPIO module 138 is coupled to the fast GPIO module 136. The APB bus 132 is coupled to the GPIO module 138. The APB bus 132 is coupled to a series of Serial Peripheral Interface/Inter-Integrated Circuit (SPI/I2C) interfaces 140 and a series of Multi-bit Serial Peripheral Interfaces (MSPI)s 142. The MSPIs 142 are also coupled to the AXI bus 134 and provide access to external memory devices.

The APB bus 132 also is coupled to a SPI/I2C interface 144, a universal serial bus (USB) interface 146, an ADC 148, an Integrated Inter-IC Sound Bus (I2S) interface 150, a set of Universal Asynchronous Receiver/Transmitters (UART)s 152, a timers module 154, a watch dog timer circuit 156, a series of pulse density modulation (PDM) interfaces 158, a low power audio ADC 160, a cryptography module 162, a Secure Digital Input Output/Embedded Multi-Media Card (SDIO/eMMC) interface 164, and a SPI/I2C slave interface module 166. The PDM interfaces 158 may be connected to external digital microphones. The low power audio ADC 160 may be connected to an external analog microphone through internal programmable gain amplifiers (PGA).

A system non-volatile memory (NVM), which is 2 MB in size in this example, is accessible through the AXI bus 134. A system static random-access memory (SRAM) 170, which is 1 MB in this example is accessible through the AXI bus 134. The microcontroller system 100 includes a display interface 172 and a graphics interface 174 that are coupled to the APB bus 132 and the AXI bus 134.

Components of the disclosed microcontroller system 100 are further described by U.S. Provisional Ser. No. 62/557,534, titled "Very Low Power Microcontroller System," filed Sep. 12, 2017; U.S. application Ser. No. 15/933,153, filed Mar. 22, 2018 titled "Very Low Power Microcontroller System," (Now U.S. Pat. No. 10,754,414), U.S. Provisional Ser. No. 62/066,218, titled "Method and Apparatus for Use in Low Power Integrated Circuit," filed Oct. 20, 2014; U.S. application Ser. No. 14/855,195, titled "Peripheral Clock Management," (Now U.S. Pat. No. 9,703,313), filed Sep. 15, 2015; U.S. application Ser. No. 15/516,883, titled "Adaptive Voltage Converter," (Now U.S. Pat. No. 10,338,632), filed Sep. 15, 2015; U.S. application Ser. No. 14/918,406, titled "Low Power Asynchronous Counters in a Synchronous System," (Now U.S. Pat. No. 9,772,648), filed Oct. 20, 2015; U.S. application Ser. No. 14/918,397, titled "Low Power Autonomous Peripheral Management," (Now U.S. Pat. No. 9,880,583), filed Oct. 20, 2015; U.S. application Ser. No. 14/879,863, titled "Low Power Automatic Calibration Method for High Frequency Oscillators," (Now U.S. Pat. No. 9,939,839), filed Oct. 9, 2015; U.S. application Ser. No. 14/918,437, titled "Method and Apparatus for Monitoring Energy Consumption," (Now U.S. Pat. No. 10,578,656), filed Oct. 20, 2015; U.S. application Ser. No. 17/081,378, titled "Improved Voice Activity Detection Using Zero Crossing Detection," filed Oct. 27, 2020, U.S. application Ser. No. 17/081,640, titled "Low Complexity Voice Activity Detection Algorithm," filed Oct. 27, 2020, all of which are hereby incorporated by reference.

Figure 4:
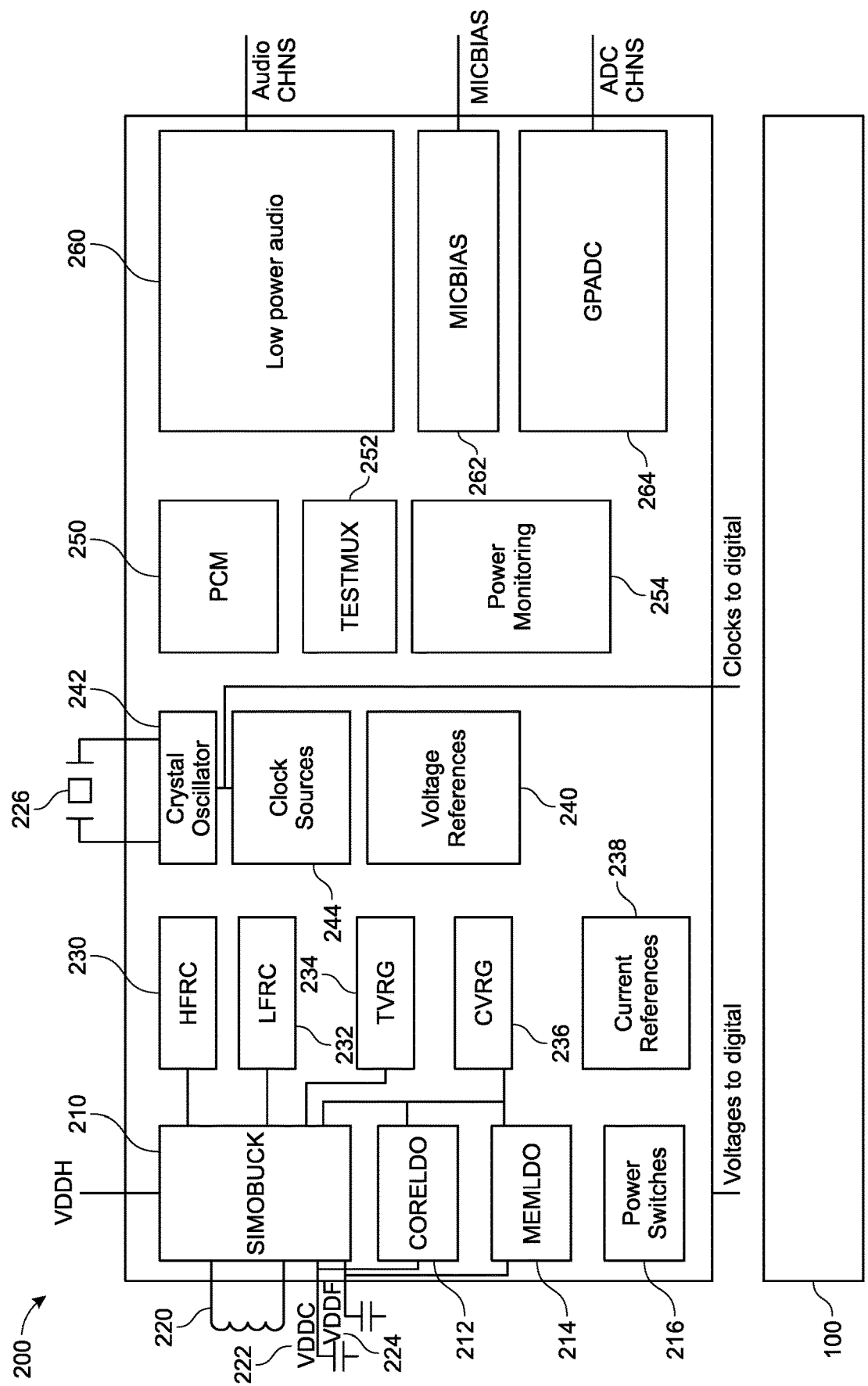
FIG. 4 is a block diagram illustrating an example of an analog module that supplies power, external signals, and clock signals to the low-power microcontroller system of FIG. 1, according to aspects of the present disclosure.

FIG. 4 shows a block diagram of an analog module 200 that interfaces external components with the microcontroller system 100 in FIGS. 1-3. The analog module 200 supplies power to different components of the microcontroller system 100 as well as providing clocking signals to the microcontroller system 100. The analog module 200 includes a Single Inductor Multiple Output (SIMO) buck converter 210, a core low drop-out (LDO) voltage regulator 212, and a memory LDO voltage regulator 214. The LDO voltage regulator 212 supplies power to processor cores of the microcontroller system 100, while the memory LDO voltage regulator 214 supplies power to volatile memory devices of the microcontroller system 100 such as the SRAM 170. A switch module 216 represents switches that allow connection of power to the different components of the microcontroller system 100.

The SIMO buck converter module 210 is coupled to an external inductor 220. The module 200 is coupled to a Voltage dipolar direct core (VDDC) capacitor 222 and a voltage dipolar direct flash (VDDF) capacitor 224. The VDDC capacitor 222 smooths the voltage output of the core LDO voltage regulator 212 and the SIMO buck converter 210. The VDDF capacitor 224 smooths the voltage output of the memory LDO voltage regulator 214 and the SIMO buck converter 210. The module 200 is also coupled to an external crystal 226.

The SIMO buck converter 210 is coupled to a high frequency reference circuit (HFRC) 230, a low frequency reference circuit (LFRC) 232, and a temperature voltage regulator (TVRG) circuit 234. The HFRC provides all the primary clocks for the high frequency digital processing blocks in the microcontroller system 100 except for audio, radio and high power mode clocks. In this example, the LFRC oscillator includes a distributed digital calibration function similar to that of the external oscillator. A compensation voltage regulator (CVRG) circuit 236 is coupled to the SIMO buck converter 210, the core LDO voltage regulator 212, and the memory LDO voltage regulator 214. Thus, both trim compensation and temperature compensation are performed on the voltage sources. A set of current reference circuits 238 is provided as well as a set of voltage reference circuits 240. The reference circuits 238 and 240 provide stable and accurate voltage and current references, allowing the maintenance of precise internal voltages when the external power supply voltage changes.

In this example, the LDO voltage regulators 212 and 214 are used to power up the microcontroller system 100. The more efficient SIMO buck converter 210 is used to power different components on demand.

A crystal oscillator circuit 242 is coupled to the external crystal 226. The crystal oscillator circuit 242 provides a drive signal to a set of clock sources 244. The clock sources 244 include multiple clocks providing different frequency signals to the components on the microcontroller system 100. In this example, three clocks at different frequencies may be selectively coupled to drive different components on the microcontroller system 100.

The analog module 200 also includes a process control monitoring (PCM) module 250 and a test multiplexer 252. Both the PCM module 250 and the test multiplexer 252 allow testing and trimming of the microcontroller system 100 prior to shipment. The PCM module 250 includes test structures that allow programming of the compensation voltage regulator 236. The test multiplexer 252 allows trimming of different components on the microcontroller system 100. The analog module 200 includes a power monitoring module 254 that allows power levels to different components on the microcontroller system 100 to be monitored. The power monitoring module 254 in this example includes multiple state machines that determine when power is required by different components of the microcontroller system 100. The power monitoring module 254 works in conjunction with the power switch module 216 to supply appropriate power when needed to the components of the microcontroller system 100. The analog module 200 includes a low power audio module 260 for audio channels, a microphone bias module 262 for biasing external microphones, and a general-purpose analog to digital converter 264.

Referring now to other aspects of the present disclosure, real-world applications require different levels of compute and sensing, depending on the specific context of the respective applications. The present disclosure provides a mechanism for configuring, for example, sensors, actuators, algorithms, and CPU power modes to minimize the power used for particular contexts. Accordingly, the disclosed mechanism changes, for example, algorithms, sensor configurations, and/or CPU power modes based on context awareness to (a) reduce power utilization when less computations is required, and (b) to enable higher power modes when more sensing or computation is required. The context is based on analysis of data from one or more sensors.

For example, a disclosed system includes a first algorithm in the form of a low-power algorithm that detects motion. If there is no motion detected, no action is taken, thus conserving energy. If motion is detected, a second algorithm that is also low-power algorithm detects the type of moving object (e.g., a human, an animal, a car, a plane, etc.). If the type of moving object is not applicable (e.g., we are looking for a human, but the motion is associated with a plane), no action is taken, thus continuing to conserve energy. In other words, the system changes back to the motion detection mode, unloading the object detection algorithm, which is the lowest power state (i.e., in this example, there are three levels of power consumption). If the moving object is applicable, a third algorithm that is in the form of a high-power algorithm detects which human being is being detected (e.g., it's "Bob," who is in the right place at the right time). This third algorithm is the only time that high energy is being used, due to algorithm complexity and higher data required to accurately identify the specific human being (i.e., "Bob").

As a result, some benefits of the present disclosure are directed to an increase in power efficiency because higher-power algorithms, CPU modes, sensors, and actuators are used only when context requires it. Yet another benefit of the present disclosure is that it provides a generalized approach for implementing and extending, for example, all cascading hierarchy of models (such as detecting spoken keywords) to adaptive behavior of sensors, actuators, and/or multiple devices working as a system.

Figure 5:
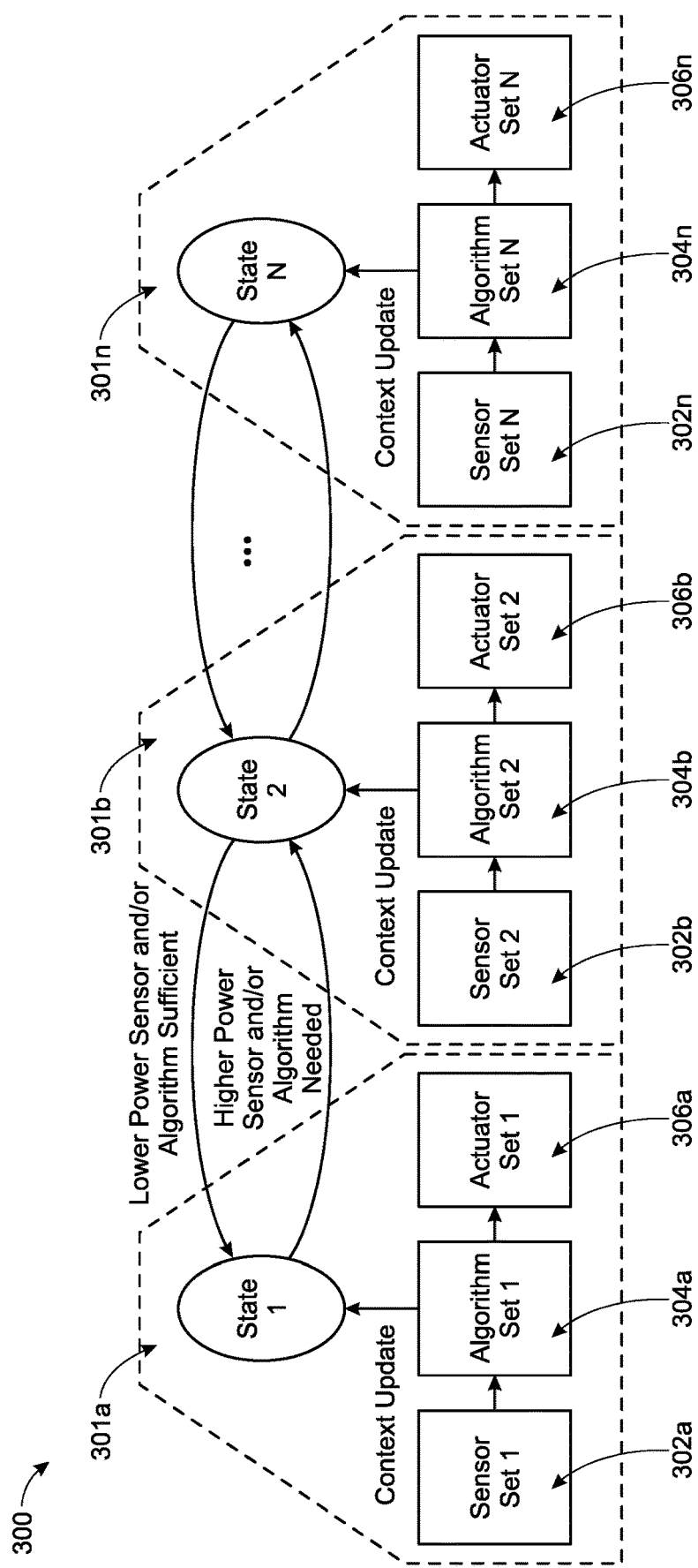
FIG. 5 is a diagrammatic illustrating a general context awareness system, according to aspects of the present disclosure.

Referring to FIG. 5, one aspect of the present disclosure is directed to a context awareness system 300 that is used to select the lowest power sensors, actuators, and algorithms required in a specific context. The system 300 is optionally configured in accordance with any of the features described above in reference to the system 100 illustrated in FIGS. 1-3 and the analog module 200 illustrated in FIG. 4.

A plurality of states includes a first state 301a, a second state 301b, and a third state 301n, with each state corresponding to a CPU power mode. Each state 301a-301n has one or more corresponding sensors (1-N), algorithms (1-N), and actuators (1-N), which are selected from respective sets as individual or sets of sensors, actuators, and algorithms.

The sensors are collectively referred to as a sensor set, with each state 301a-301n having a specific sensor set with at least one sensor. Sensor sets are optionally configured to share one or more common sensors. The sensors include one or more active sensors and/or sensor modes. Some sensor examples include motion detectors, cameras in low resolution mode, cameras in high resolution modes, accelerometers, and microphones.

The algorithms are collectively referred to as an algorithm set, with each state 301a-301n having a specific algorithm with at least one algorithm. Algorithms subsets are optionally configured to share one or more common algorithms. Some algorithm examples include a low-frequency motion sensor sampling algorithm, a low-resolution person detection machine learning (ML) algorithm, and a high-resolution person identification deep learning (DL) algorithm.

The actuators are collectively referred to as an actuator set, with each state 301a-301n having a specific actuator set with at least one actuator. Actuator subsets are optionally configured to share one or more common actuators. Some actuator examples include a Bluetooth radio, a security light, and an audio speaker.

By way of example the first state 301a is a lower power state that includes a first sensor set 302a, a first algorithm set 304a, and a first actuator set 306a. The first sensor set 302a detects context data that is received by the first algorithm set 304a. The first algorithm set 304a determines a respective context update and provides any required command for the first actuator set 306a to perform a required action. If the system 300 determines that a higher power mode is required, the first state 301a is switched to the second state 301b, which corresponds to a higher mode of operation than the first state 301a. The second state 301b includes a second sensor set 302b, a second algorithm set 304a, and a second actuator set 306n. If, changes in sensed information results in a context update that requires a different mode of operation, the system 300 determines that the higher power mode of the second state 301b is no longer required. As a result, the second state 301b is switched back to the first state 301a (to conserve energy).

Optionally, the first state 301a or the second state 301b are switched to the third state 301n, which includes a third sensor set 302n, a third algorithm set 304n, and a third actuator set 306n. The third state 301n is configured to correspond to a different power mode, higher or lower, than either of the first state 301a or the second state 301b. Additional states are optionally included, as needed.

Figure 6:
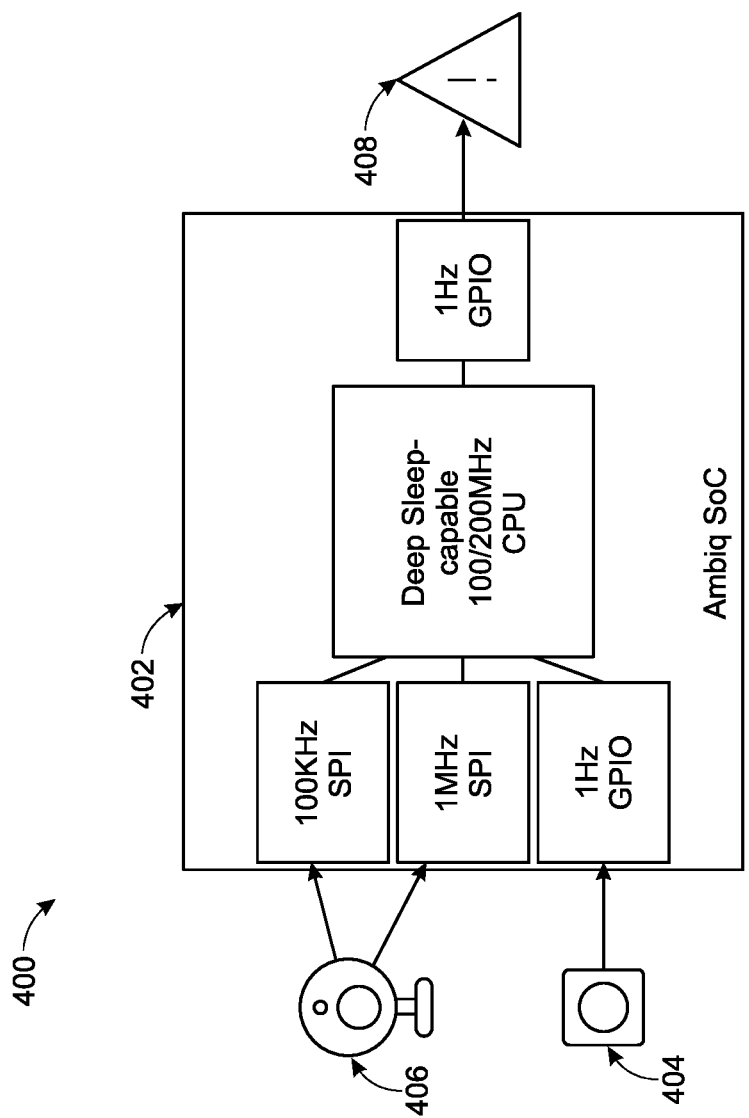
FIG. 6 is a diagrammatic illustrating a context awareness system for sounding an alarm, according to aspects of the present disclosure.

Referring to FIG. 6, a system 400 shows an illustrative example for sounding an alarm if an unauthorized person walks in front of the system 400. The system 400 is optionally configured in accordance with any of the features described above in reference to the system 100 illustrated in FIGS. 1-3, the analog module 200 illustrated in FIG. 4, and the context awareness system 300 illustrated in FIG. 5.

The system 400 includes a microcontroller 402, a motion sensor 404, a camera 406, and an alarm speaker 408. The microcontroller 402 is capable of operating in multiple power modes and includes a system-on-a-chip (SoC) CPU. The camera 406 includes a low resolution mode, which consumed low power, and a high resolution mode, which consumes more power than the low resolution mode.

The motion sensor 404, the camera 406, and the alarm speaker 408 are connected to the microcontroller 402 via a variety of interfaces. The motion sensor 404 and the alarm speaker 408 are connected via low-speed general purpose input/output (I/O) pins, which the microcontroller 402 monitors with CPU involvement. The general purpose I/O pins are included in a general purposes I/O (GPIO) interface. The camera 406 is connected via a variable-speed serial peripheral interface.

The microcontroller 402 has the SoC CPU that is capable of various power modes, which include, for example, an ultra-low power deep-sleep mode, a 100 megahertz (Mhz) mode, and a 200 Mhz mode. Other configuration power settings are omitted here, for brevity, but are contemplated within the scope of the present disclosure.

Figure 7:
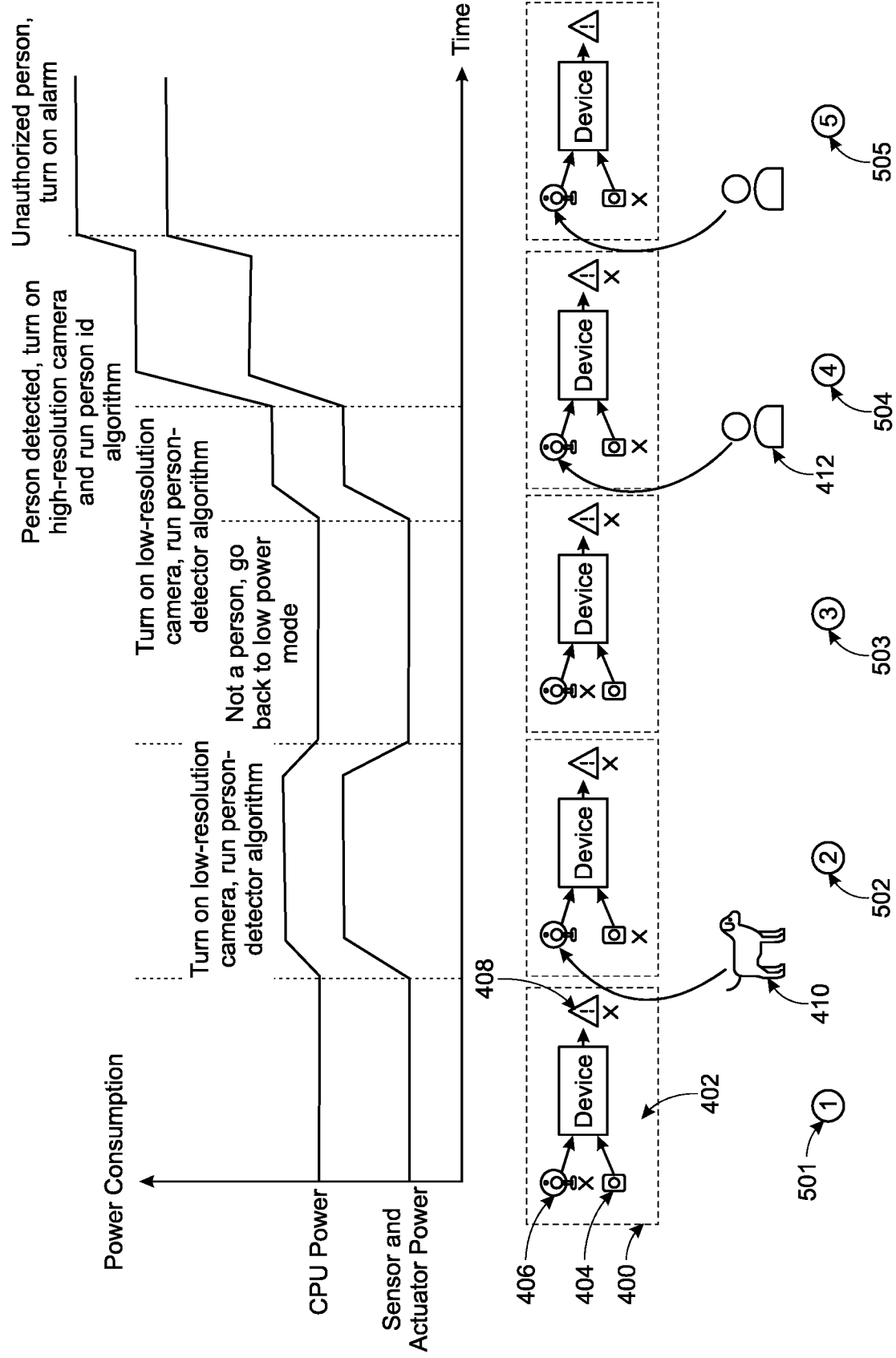
FIG. 7 is a diagrammatic illustrating operational phases of the context awareness system of FIG. 6, according to aspects of the present disclosure.

Referring to FIG. 7, the system 400 is initially in a very low power mode during a first phase 501. In the first phase 501, the camera 406, the alarm speaker 408, and their respective interfaces, are turned off. Consequently, the CPU of the microcontroller 402 is in deep-sleep, waiting for an interrupt from the GPIO interface of the motion sensor 404. The respective CPU, sensor, and actuator power are low, as represented on the illustrated power consumption axis.

A non-person, such as an animal 410, causes the interrupt, prompting a switch to a higher power mode at a second phase 502. For the second phase 502, and subsequent phases, reference numerals for the system 400, the microcontroller 402, the motion sensor 404, the camera 406, and the alarm speaker 408 are omitted in FIG. 7 for brevity purposes. The camera 406 is turned on and is connected to a low-speed interface. The CPU of the microcontroller 402 is woken up from the deep-sleep and is placed in the 100 Mhz mode. A person-detection algorithm is executed, which examines input from the camera 406. Based on the examined input, the algorithm does not detect a person, and, thus, prompts the system 400 to re-enter the very low power mode during a third phase 503. The respective CPU, sensor, and actuator power are higher during at least a portion of the second phase 502, than in the first phase 501 or the third phase 503, as represented on the power consumption axis.

Later, a person 412 triggers the motion sensor 404 during a fourth phase 504. The triggering of the motion sensor 404 prompts the system 400 to turn on the camera 406 and to run a person-detecting algorithm. The respective CPU, sensor, and actuator power is now higher than in all previous phases 501-503, during at least a portion of the fourth phase 504. This time, the algorithm confirms that the person 412 has been detected, and the system 400 moves to the highest power mode to run a sophisticated person-identification algorithm.

In a fifth phase 505, the alarm 408 is turned on based on a determination that the detected person is an unauthorized person (e.g., a thief, a small child, etc.). In the fifth phase 505, the respective CPU, sensor, and actuator power is higher than in all the previous phases 501-504. Thus, power is conserved in most of the phases 501-505, during which context awareness indicates that less power is required (e.g., no motion is detected, non-person is detected, authorized person is detected, etc.).

Figure 8:
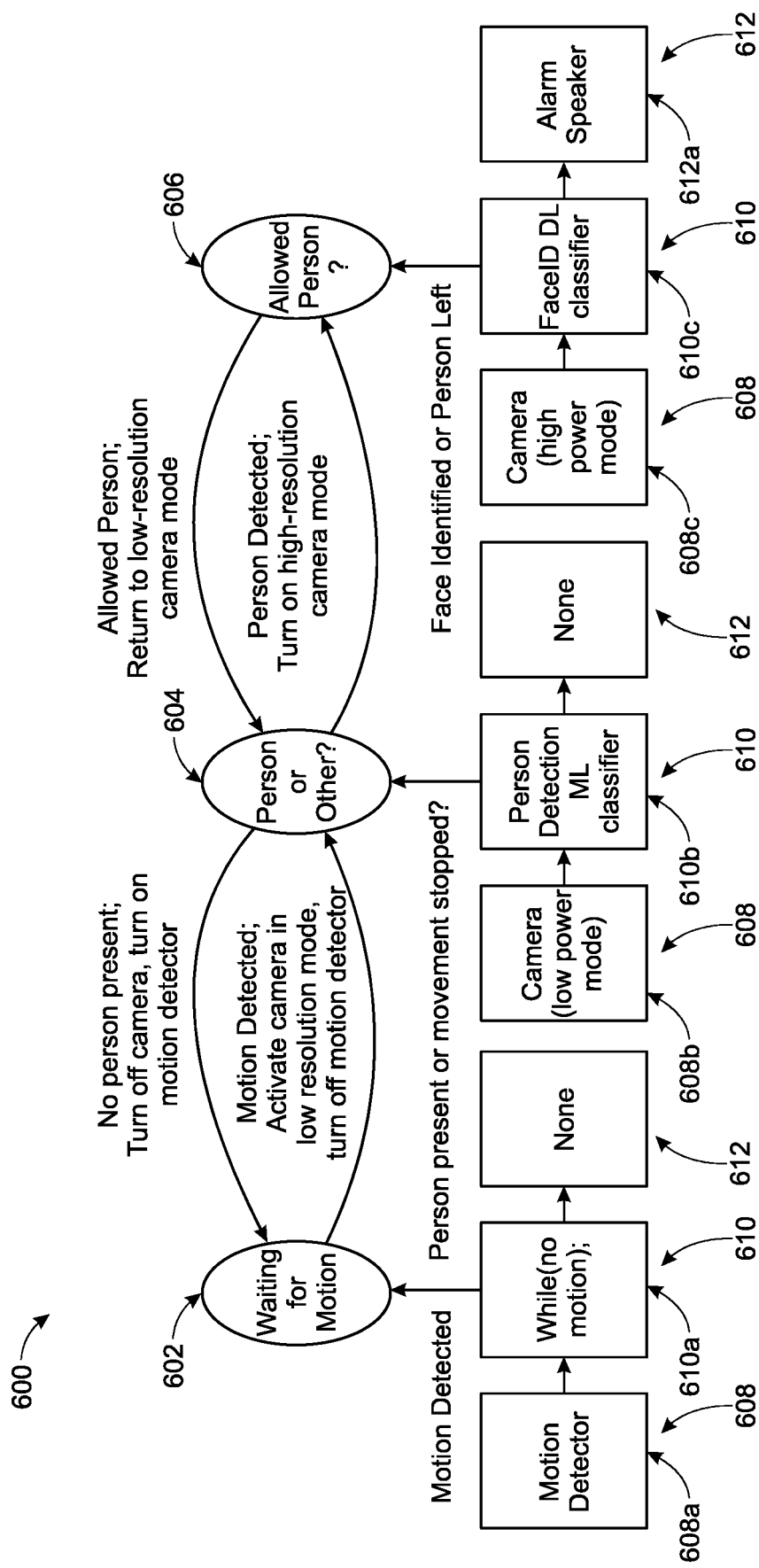
FIG. 8 is a diagrammatic illustrating another context awareness system for sounding an alarm, according to aspects of the present disclosure.

Referring to FIG. 8, a system 600 shows another illustrative example for sounding an alarm if an unauthorized person is detected. The system 600 is optionally configured in accordance with any of the features described above in reference to the system 100 illustrated in FIGS. 1-3, the analog module 200 illustrated in FIG. 4, the context awareness system 300 illustrated in FIG. 5, and the system 400 illustrated in FIGS. 6 and 7.

Internally, the system 600 maintains a state correlated with the respective context. By way of example, the system 600 has at least three states, including a first state 602, a second state 604, and a third state 606.

The first state 602 is a "Waiting for Motion" state, in which a sensor set 608 includes only a motion detector 608a. The motion detector 608a is the only sensor that is operational, for conserving energy. An algorithm set 610 includes a very low power, low frequency sampling loop 610a that is waiting for motion to be detected. If no person is present, a camera 608b is turned off and the motion detector 608a is maintained on. If motion is detected, the camera 608b is activated in a low resolution mode, and the motion detector 608a is turned off. An actuator set 612 is empty in the first state 602, with no powered-on actuators.

If motion is detected, the system 600 transitions to the second state 604, which is a "Person or Other" state in which the context changes from "no motion" to "motion detected." In the second state 604, the sensor set 608 includes only the camera 608b in the low resolution mode, while all other sensors are off. The algorithm set 610 is now a "Person Detection ML Classifier" 610b, which is a computationally simple ML algorithm that classifies a low resolution image captured by the camera 608b into a person, not-a-person, or no motion determination. Based on the simplicity of the algorithm 610b, a microcontroller (not shown) of the system 600 is operated at a very low frequency, resulting in saving power. The actuator set 612 remains empty, with no powered-on actuators.

If the algorithm 610b determines that a person is detected, the system 600 transitions to "Allowed State?" in the third state 606. Otherwise, if the algorithm 610b determines that no motion is detected, the system 600 transitions back to the "Waiting for Motion" first state 602. In the third state 606, the sensor set 608 includes a high resolution mode of the camera 608c, while all other sensors are off. The algorithm set 610 is now a "Person Identification DL Classifier" 610c, in which a computationally-intense DL algorithm requires a high resolution image that is captured by the camera 608c to determine the identity of the person detected by the system 600. Because the algorithm 610c is computationally complex, the microcontroller of the system 600 must operate at a high frequency, thus consuming more power than in the first state 602 or the second state 604. The actuator set 612 now includes an alarm speaker 612a, which is triggered if the detected person is not authorized to be within the range of the system 600.

Figure 9:
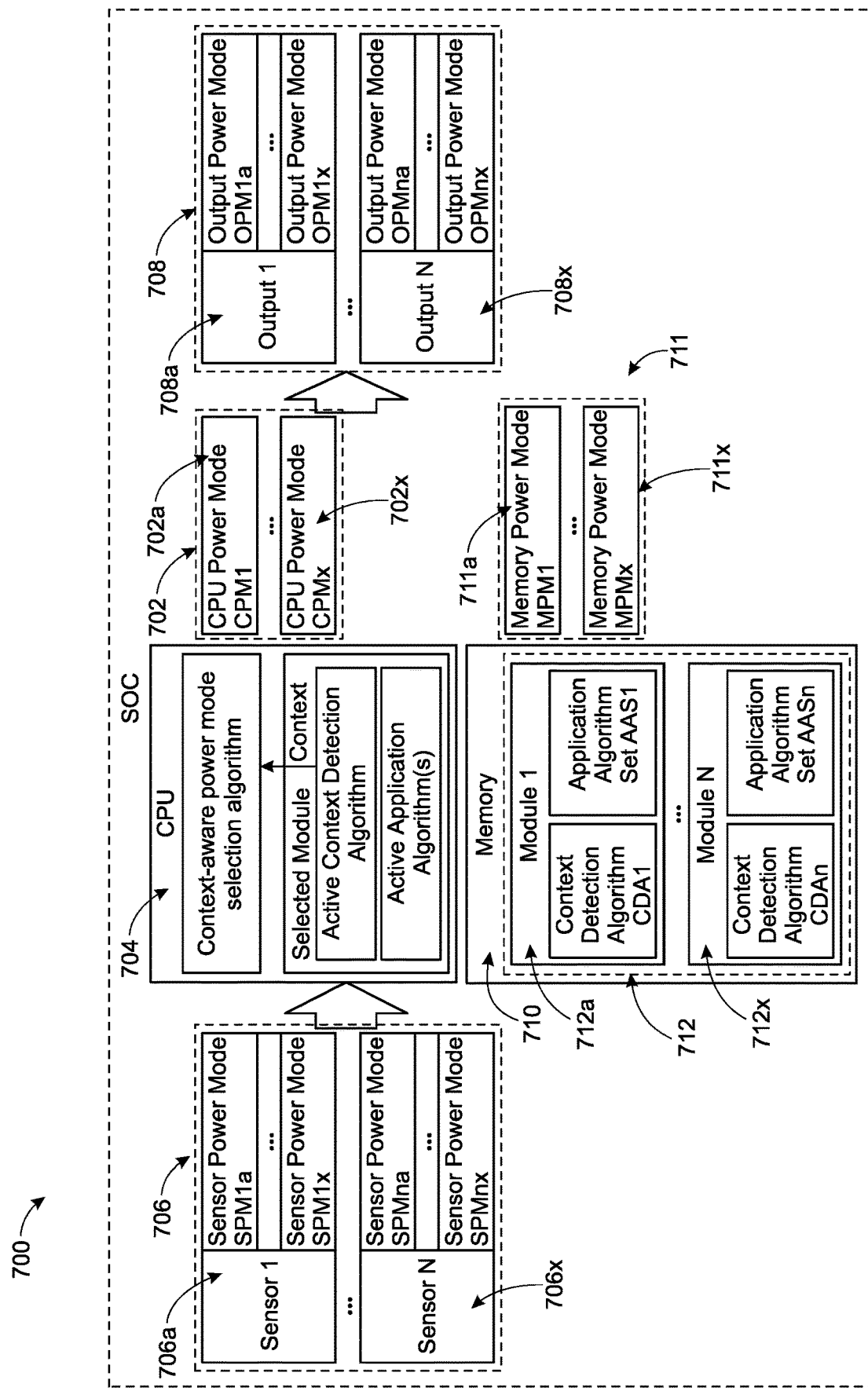
FIG. 9 is a diagrammatic illustrating a system for computing devices that is directed to select a power mode, according to aspects of the present disclosure.

Referring to FIG. 9, a system 700 for computing devices is directed to select a power mode from a plurality of power modes 702, based on context-identifying input. The system 700 is optionally configured in accordance with any of the features described above in reference to the system 100 illustrated in FIGS. 1-3, the analog module 200 illustrated in FIG. 4, the context awareness system 300 illustrated in FIG. 5, the system 400 illustrated in FIGS. 6 and 7, and the system 600 illustrated in FIG. 8.

The system 700 includes a CPU 704 that is configured to perform in one of the plurality of power modes 702. Each power mode 702 is pre-defined to have a different code-execution performance capability than remaining ones of the plurality of power modes 702. For example, a first power mode 702a has a different code-execution performance capability than a second power mode 702x.

The system 700 further includes at least one sampling peripheral 706, or a set of sampling peripherals 706, that is communicatively coupled to the CPU 704. The set of sampling peripherals 706 receives context-identifying input from one or more sensors 706a, 706x. Each sampling peripheral 706 is dedicated to a specific power mode of the plurality of power modes 702. Each sampling peripheral 706 has a different behavior than remaining ones of the set of sampling peripherals 706. For example, a first sampling peripheral, in the form of a first sensor 706a, has a different behavior than a second sampling peripheral, in the form of a second sensor 706x.

The system 700 further includes at least one electrical output 708, or a set of electrical outputs 708, that is communicatively coupled to the CPU 704. Each electrical output 708 is dedicated to a specific power mode of the plurality of power modes 702. Each electrical output 708 has a different behavior than remaining ones of the set of electrical outputs 708. For example, a first electrical output 708a has a different behavior than a second electrical output 708x.

The system 700 further includes a memory device 710 that is communicatively coupled to the set of sampling peripherals 706 and to the set of electrical outputs 708. The memory device 710 has stored thereon a plurality of modules 712, and is configured to select and execute a specific module from the plurality of modules 712 based on the context-identifying input triggering the specific module 712. The memory device 710 is configured to perform in one of a plurality of memory modes 711, which include a first memory mode 711a and a second memory mode 711x.

Each module 712 is executed, if triggered, to receive the context-identifying input from a dedicated sampling peripheral of the set of sampling peripherals 706. Each module 712 is further executed, if triggered, to operate the CPU 704 in a dedicated power mode of the plurality of power 702. Optionally, yet, each module 712 is further executed, if triggered, to cause a dedicated electrical output 708 to perform in the respective behaviors According to an exemplary feature of the system 700, the plurality of modules 712 includes a first module 712a that is configured to operate the CPU 704 in the first power mode 702a of the plurality of power modes 702. The first power mode 702a is a low power mode. The plurality of modules 712 also includes a second module 712x that is configured to operate the CPU 704 in the second power mode 702x of the plurality of modes 702. The second power mode 702x is a high power mode, which operates the CPU 704 at a higher frequency than in the low power mode of the first module 712a.

According to another exemplary feature of the system 700, the memory device 710 is further configured to switch the first module 712a to the second module 712x based on detecting that the context-identifying input is applicable to the high power mode. The memory device 710 is further optionally configured to switch from the second module 712x to the first module 712a based on detecting that the context-identifying input is applicable to the low power mode.

According to another exemplary feature of the system 700, each of the power modes 702 operates in a dedicated frequency setting. For example, the dedicated frequency setting includes a 50 Mhz frequency setting, a 100 Mhz frequency setting, and a 200 Mhz frequency setting.

According to another exemplary feature of the system 700, the memory device 710 is a memory configuration that is selected from one or more on/off or half-off configurations. For example, the memory configuration is a static random access memory (SRAM) on-off configuration, a tightly-coupled-memory on/off configuration, a tightly-coupled-memory half-off configuration, or a cache on/off configuration.

According to another exemplary feature of the system 700, each module 712 operates the CPU 704 in response to a state of the dedicated sampling peripheral 706. The state is either an on state or an off state.

According to another exemplary feature of the system 700, each module 712 operates the CPU 704 in response to a state of the dedicated sampling peripheral 706. The state is either an on state or an off state.

According to another exemplary feature of the system 700, the different code-execution performance capability includes outputting, via a respective electrical output 708, one or more of a different output rate, a different output accuracy, and a different output power.

According to another exemplary feature of the system 700, the different code-execution performance capability includes turning on or off a respective electrical output 708. According to another exemplary feature of the system 700, the CPU 704 is a SoC CPU.

According to another exemplary feature of the system 700, each module 712 is further executed with pre-defined performance, sensor, and output requirements. For example, the pre-defined performance is a pre-defined maximum latency. In another example, the pre-defined sensor requirements include one or more of a pre-defined sensor accuracy and sampling rate.

According to another exemplary feature of the system 700, the context-identifying input is based on one or more of external input, internal input, or both. For example, external input includes detecting motion of an object, as described above. In another example, internal input includes a characteristic of the CPU 704, such as temperature.

According to another exemplary feature of the system 700, the memory device 710 is further configured to switch the plurality of power modes 702 from a low power mode to a high power mode.

Figure 10:
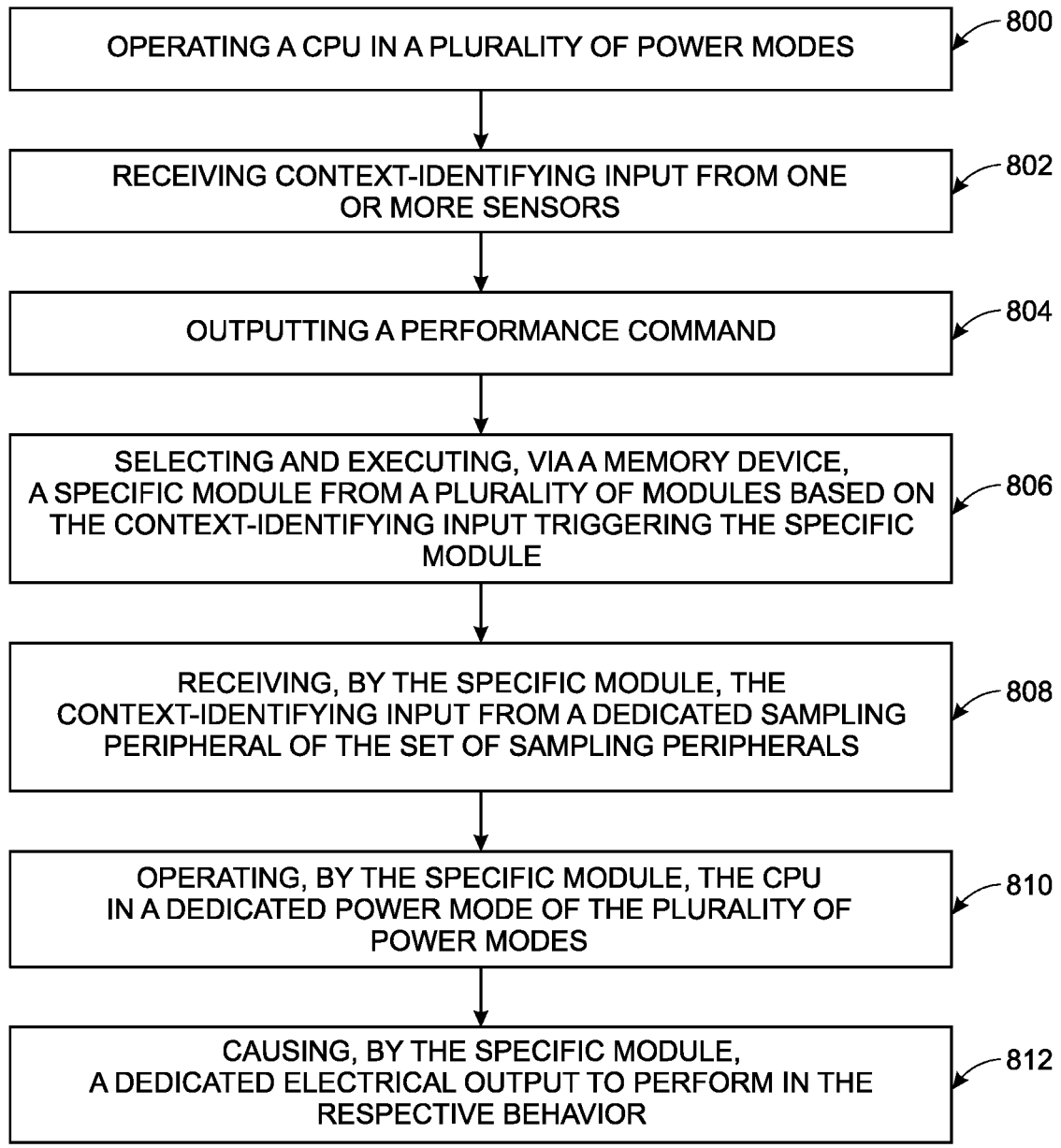
FIG. 10 is a flowchart illustrating a method for selecting a power mode for a computing device, according to aspects of the present disclosure.

Referring to FIG. 10, a method is directed to selecting a power mode for a computing device. The method works in combination with or in addition to any of the features and systems described above in the present disclosure.

At step 800, the method includes operating a central processing unit (CPU) in a plurality of power modes. Each power mode is pre-defined to have a different code-execution performance capability than remaining ones of the plurality of power modes.

At step 802, the method further includes receiving, via a set of sampling peripherals, context-identifying input from one or more sensors. Each sampling peripheral is dedicated to a specific power mode of the plurality of power modes. For example, the same sampling peripheral, (e.g., a camera) can operate in different power modes, such as a low resolution power mode or a high resolution power mode. Each sampling peripheral has a different behavior than remaining ones of the set of sampling peripherals.

At step 804, the method further includes outputting, via a set of electrical outputs, a performance command. Each electrical output is dedicated to a specific power mode of the plurality of power modes, and each electrical output has a different behavior than remaining ones of the set of electrical outputs.

At step 806, the method further includes selecting and executing, via a memory device, a specific module from a plurality of modules based on the context-identifying input triggering the specific module. At step 808, the method further includes receiving, by the specific module, the context-identifying input from a dedicated sampling peripheral of the set of sampling peripherals.

At step 810, the method further includes operating, by the specific module, the CPU in a dedicated power mode of the plurality of power modes. At step 812, the method further includes causing, by the specific module, a dedicated electrical output to perform in the respective behavior.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A system for computing devices, the system comprising:
   a central processing unit (CPU) configured to perform in a plurality of power modes, each power mode being pre-defined to have a different code-execution performance capability than remaining ones of the plurality of power modes;
   a sampling peripheral communicatively coupled to the CPU for receiving context-identifying input from one or more sensors, the sampling peripheral having a sampling configuration associated with a specific power mode of the plurality of power modes, the sampling configuration having an associated behavior that is specific to the sampling peripheral; and
   a memory device communicatively coupled to the sampling peripheral, the memory device having stored thereon a plurality of modules, the memory device being configured to select and execute a specific module from the plurality of modules based on the context-identifying input triggering the specific module, each module being executed, if triggered, to
   receive the context-identifying input from the at least one sampling peripheral, and
   operate the CPU in a dedicated power mode of the plurality of power modes.

2. The system of claim 1, further including a set of sampling peripherals that includes the sampling peripheral, each sampling peripheral of the set of sampling peripherals being dedicated to a respective power mode of the plurality of power modes, each sampling peripheral of the set of sampling peripherals having a different behavior than remaining ones of the set of sampling peripherals.

3. The system of claim 1, wherein the plurality of modules includes:
   a first module configured to operate the CPU in a first power mode of the plurality of power modes; and
   a second module configured to operate the CPU in a second power mode of the plurality of power modes, the first power mode operating the CPU at a different frequency setting than in the second power mode.

4. The system of claim 3, wherein the memory device is further configured to:
   switch from the first module to the second module based on detecting that the context-identifying input is applicable to the first power mode; and
   switch from the second module to the first module based on detecting that the context-identifying input is applicable to the second power mode.

5. The system of claim 1, wherein each power mode operates in a dedicated frequency setting.

6. The system of claim 1, wherein the memory device is a memory configuration selected from one or more of a static random access memory (SRAM) on/off configuration, a tightly-coupled-memory on/off configuration, a tightly-coupled-memory half-off configuration, and a cache on/off configuration.

7. The system of claim 1, wherein each module operates the CPU in response to a state of the sampling peripheral, the state being an on state or an off state.

8. The system of claim 1, wherein the context-identifying input from the one or more sensors includes one or more of a sampling rate, a sampling accuracy, and a sampling mode.

9. The system of claim 1, further comprising an electrical output communicatively coupled to the CPU, the electrical output having an output configuration associated with a specific power mode of the plurality of power modes, the output configuration having an associated behavior that is specific to the electrical output.

10. The system of claim 9, wherein the different code-execution performance capability includes outputting, via the electrical output, one or more of a different output rate, a different output accuracy, and a different output power.

11. The system of claim 9, wherein the different code-execution performance capability includes turning on or off the electrical output.

12. The system of claim 1, wherein the CPU is a system-on-a-chip (SoC) CPU.

13. The system of claim 1, wherein each module is further executed with pre-defined performance, sensor, and output requirements.

14. The system of claim 1, wherein the context-identifying input is based on one or more of external input, internal input, or both.

15. The system of claim 1, wherein the memory device is further configured to switch the plurality of power modes from a first power mode to a second power mode.

16. The system of claim 1, further comprising a non-sampling peripheral that is communicatively coupled to the CPU, the non-sampling peripheral having a non-sampling configuration associated with a specific power mode of the plurality of power modes, the non-sampling configuration having an associated behavior that is specific to the non-sampling peripheral.

17. The system of claim 16, wherein the non-sampling peripheral is selected from a group consisting of a timer module and a cryptography module.

18. A method for selecting a power mode for a computing device, the method comprising:
- operating a central processing unit (CPU) in a plurality of power modes, each power mode being pre-defined to have a different code-execution performance capability than remaining ones of the plurality of power modes;
- receiving, via a sampling peripheral, context-identifying input from one or more sensors, the sampling peripheral having a sampling configuration associated with a specific power mode of the plurality of power modes, the sampling configuration having an associated behavior that is specific to the sampling peripheral;
- selecting and executing, via a memory device, a specific module from a plurality of modules based on the context-identifying input triggering the specific module;
- receiving, by the specific module, the context-identifying input from the sampling peripheral; and
- operating, by the specific module, the CPU in a dedicated power mode of the plurality of power modes.

19. The method of claim 18, further comprising:
- in response to receiving first context-identifying input, selecting and executing a first module that operates the CPU in a first power mode of the plurality of power modes; and
- in response to receiving second context-identifying input, selecting and executing a second module configured to operate the CPU in a second power mode of the plurality of power modes, the second power mode operating the CPU at a different frequency setting than in the first power mode.

20. A non-transitory computer readable medium having stored thereon software instructions that, when executed by a processor, cause the processor to:
- receive, via a sampling peripheral, context-identifying input from one or more sensors, the sampling peripheral having a sampling configuration associated with a specific power mode of the plurality of power modes, the sampling configuration having an associated behavior that is specific to the sampling peripheral;
- select and execute, via a memory device, a specific module from a plurality of modules based on the context-identifying input triggering the specific module;
- receive, by the specific module, the context-identifying input from the sampling peripheral; and
- operate, by the specific module, the CPU in a dedicated power mode of the plurality of power modes.

* * * * *